(12) United States Patent
Venkatraman et al.

(10) Patent No.: US 11,923,917 B2
(45) Date of Patent: Mar. 5, 2024

(54) ELECTRONIC DEVICE WITH ACTIVITY-BASED POWER MANAGEMENT

(71) Applicant: Apple Inc., Cupertino, CA (US)

(72) Inventors: Kartik R. Venkatraman, San Francisco, CA (US); Shardul S. Mangade, Sunnyvale, CA (US); Alessandro Pelosi, San Jose, CA (US); Cyril de la Cropte de Chanterac, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 287 days.

(21) Appl. No.: 17/092,069

(22) Filed: Nov. 6, 2020

(65) Prior Publication Data

US 2021/0083514 A1    Mar. 18, 2021

Related U.S. Application Data

(62) Division of application No. 15/706,290, filed on Sep. 15, 2017, now Pat. No. 10,862,329.

(60) Provisional application No. 62/513,883, filed on Jun. 1, 2017.

(51) Int. Cl.
*H02J 50/10* (2016.01)
*G01S 19/01* (2010.01)
*H04B 5/00* (2006.01)

(52) U.S. Cl.
CPC ............ *H04B 5/0075* (2013.01); *G01S 19/01* (2013.01); *H02J 50/10* (2016.02); *H04B 5/0037* (2013.01)

(58) Field of Classification Search
CPC ........................................................ H02J 7/00
See application file for complete search history.

(56) References Cited

U.S. PATENT DOCUMENTS

| 9,089,016 | B2 | 7/2015 | Recker et al. |
| 9,166,438 | B2 | 10/2015 | Sultenfuss et al. |
| 9,318,898 | B2 | 4/2016 | John |
| 9,348,381 | B2 | 5/2016 | Khoo et al. |

(Continued)

FOREIGN PATENT DOCUMENTS

| CN | 104238713 A | 12/2014 |
| CN | 105700922 A | 6/2016 |

(Continued)

*Primary Examiner* — Robert Grant
(74) *Attorney, Agent, or Firm* — Treyz Law Group, P.C.; Tianyi He

(57) ABSTRACT

An electronic device may have a power system. The power system may receive power such as wireless power or wired power and may use a portion of the received power to charge a battery. Power consumption by control circuitry in the device can be adjusted by deactivating or activating processor cores in the control circuitry and by selectively starting or stopping software activities. By selectively reducing power consumption by circuitry in the electronic device other than battery charging circuitry in the power system that is charging the battery, additional power may be made available to charge the battery and/or battery capacity can be extended. The electronic device may reduce non-battery-charging activities in the device in response to information gathered with sensors such as motion and temperature information, information from the power system, information on device location, information on software settings, and other information.

15 Claims, 3 Drawing Sheets

(56) References Cited

U.S. PATENT DOCUMENTS

| | | | |
|---|---|---|---|
| 9,402,545 B2 | 8/2016 | Baker et al. | |
| 2010/0079508 A1* | 4/2010 | Hodge | G06F 1/3206 345/697 |
| 2010/0313050 A1 | 12/2010 | Harrat et al. | |
| 2012/0295634 A1 | 11/2012 | Kim | |
| 2013/0191662 A1 | 7/2013 | Ingrassia et al. | |
| 2013/0200857 A1 | 8/2013 | Kim et al. | |
| 2014/0047259 A1 | 2/2014 | Price et al. | |
| 2014/0101611 A1 | 4/2014 | Lang et al. | |
| 2014/0347378 A1 | 11/2014 | Mukai et al. | |
| 2015/0113301 A1 | 4/2015 | Wang | |
| 2015/0115881 A1 | 4/2015 | Park et al. | |
| 2015/0323974 A1* | 11/2015 | Shuster | G06F 1/3212 713/320 |
| 2016/0079788 A1 | 3/2016 | Amasaki et al. | |
| 2016/0267623 A1 | 9/2016 | Heo | |

FOREIGN PATENT DOCUMENTS

| | | |
|---|---|---|
| CN | 106293071 A | 1/2017 |
| CN | 106681619 A | 5/2017 |
| JP | 2011-171871 A | 9/2011 |

* cited by examiner

ELECTRONIC DEVICE WITH ACTIVITY-BASED POWER MANAGEMENT

This application is a division of U.S. patent application Ser. No. 15/706,290, filed Sep. 15, 2017, which claims the benefit of provisional patent application No. 62/513,883, filed Jun. 1, 2017, each of which is hereby incorporated by reference herein in its entirety.

BACKGROUND

This relates generally to electronic devices, and, more particularly, to power management in electronic devices.

Portable electronic devices such as cellular telephones have batteries. If care is not taken, battery charging operations may not be managed satisfactorily. As a result, devices may not be fully charged when needed, charging may interfere with other device operations, or charging operations may take longer than desired.

SUMMARY

An electronic device such as a portable electronic device may have a power system with a battery. The power system receives power such as wireless power or wired power and uses a portion of the received power to charge the battery as needed.

Control circuitry in the portable electronic device is used to execute code. For example, software running on the control circuitry handles background activities such as image processing tasks, data synchronization tasks (e.g., downloading email), indexing, and other background activities. Power consumption by the control circuitry can be adjusted by deactivating or activating processor cores in the control circuitry, by adjusting other hardware settings, and/or by selectively starting or stopping software activities.

By selectively throttling power consumption by circuitry other than battery charging circuitry, additional power may be made available to charge the battery. The electronic device may prioritize charging of the battery in the device in this way in response to information gathered with sensors such as motion and temperature information, information from the power system, information on device location, information on software settings, and other information.

DETAILED DESCRIPTION

Electronic devices with batteries may be charged using wireless (e.g., inductive) charging equipment and wired power sources. As electronic devices are used by a user, information on usage patterns can be collected. Sensors and other components can also gather information on the operating environment of an electronic device. Based on this information, battery charging operations can be optimized. In some arrangements, for example, an electronic device may make reductions to software and hardware activity to give priority to battery charging operations.

Figure 1:
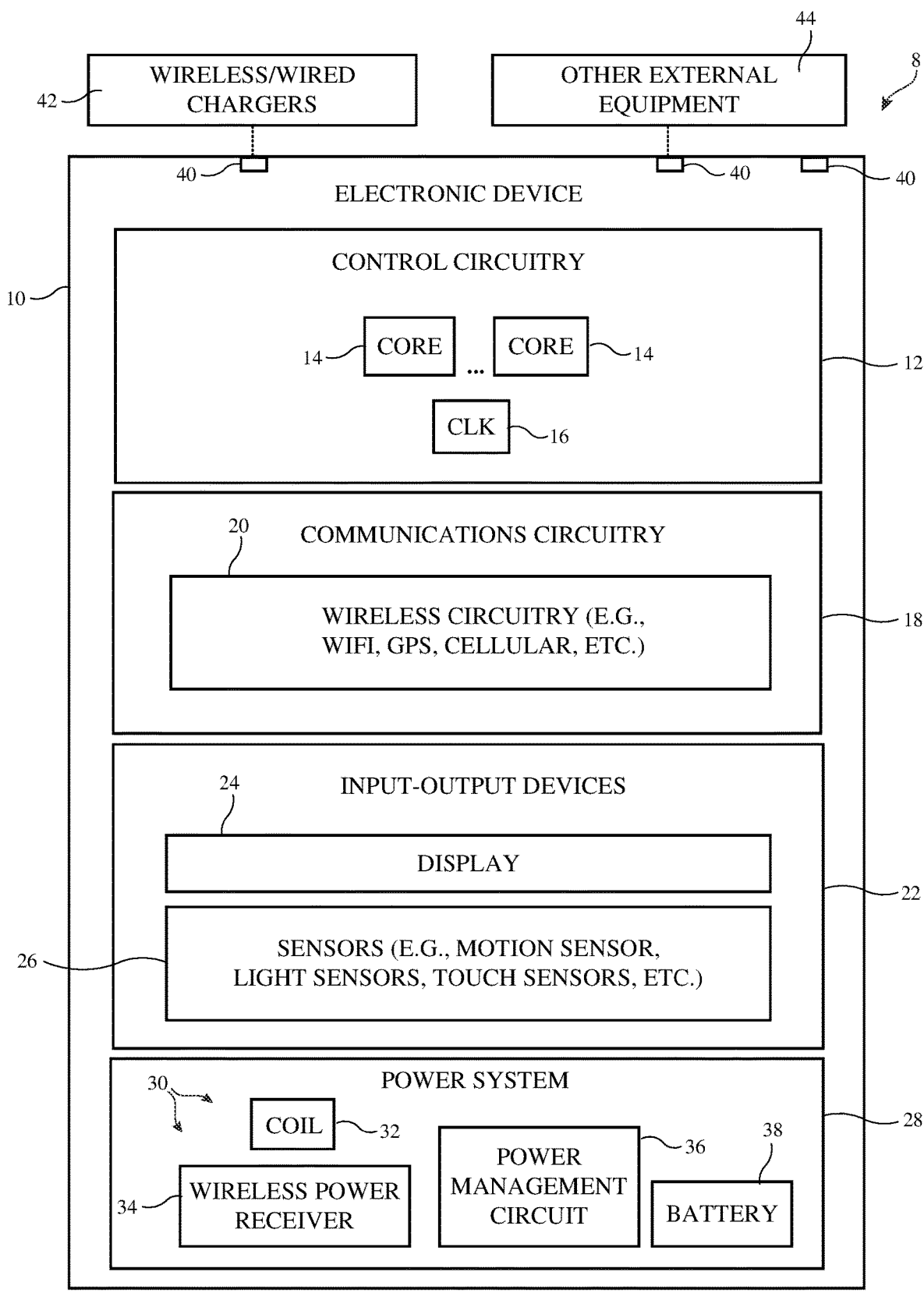
FIG. 1 is a schematic diagram of an illustrative system including an electronic device with a rechargeable battery in accordance with an embodiment.

An illustrative system that includes an electronic device with a rechargeable battery is shown in FIG. 1. As shown in FIG. 1, system 8 includes electronic devices such as electronic device 10. Electronic device 10 has battery 38. Electronic device 10 may be a cellular telephone, a computer (e.g., a tablet computer or laptop computer), a wristwatch device or other wearable equipment, and so forth. Illustrative configurations in which electronic device 10 is a portable electronic device, may sometimes be described herein as an example.

As shown in FIG. 1, exemplary electronic device 10 has control circuitry 12. Control circuitry 12 may include storage and processing circuitry such as processing circuitry associated with microprocessors, power management units, baseband processors, digital signal processors, microcontrollers, and/or application-specific integrated circuits with processing circuits. Control circuitry 12 implements desired control and communications features in device 10. For example, control circuitry 12 may be used in determining power transmission levels, processing sensor data, processing user input, and processing other information and in using this information to adjust the operation of device 10 (e.g., to adjust parameters influencing battery charging). Control circuitry 12 may be configured to perform these operations using hardware (e.g., dedicated hardware or circuitry), firmware, and/or software. Software code for performing these activities is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 12. The processing circuitry may include application-specific integrated circuits with processing circuitry, one or more microprocessors, or other processing circuitry.

The processing circuitry of control circuitry 12 may have adjustable hardware resources. For example, control circuitry 12 may include multiple processing cores 14 that can be selectively switched into or out of use. Control circuitry 12 may also have clock circuitry such as clock circuitry 16. Clock circuitry 16 may supply an adjustable processor clock (e.g., a processor clock with a frequency that can be adjusted between a low frequency f1 to conserve power and a high frequency f2 to enhance processing speed). Clock circuitry 16 may also maintain information on the current time of day and date for device 10.

Device 10 has communications circuitry 18. Communications circuitry 18 may include wired communications circuitry (e.g., circuitry for transmitting and/or receiving digital and/or analog signals via a port associated with a connector 40) and may include wireless communications circuitry 20 (e.g., radio-frequency transceivers and antennas) for supporting communications with wireless equipment. Wireless communications circuitry 20 may include wireless local area network circuitry (e.g., WiFi® circuitry), cellular telephone transceiver circuitry, satellite positioning system receiver circuitry (e.g., a Global Positioning System receiver for determining location, velocity, etc.), near-field communications circuitry and/or other wireless communications circuitry.

Device 10 may use input-output devices 22 to receive input from a user and the operating environment of device 10 and to provide output. Input-output devices 22 may include one or more visual output devices such as display 24 (e.g., a liquid crystal display, an organic light-emitting diode display, or other display). Input-output devices 22 may also include buttons, joysticks, scrolling wheels, touch pads, key pads, keyboards, microphones, speakers, displays (e.g., touch screen displays), tone generators, vibrators (e.g., piezoelectric vibrating components, etc.), cameras, sensors, light-emitting diodes and other status indicators, data ports, etc. Sensors 26 in input-output devices 22 may include force sensors, touch sensors, capacitive proximity sensors, optical proximity sensors, ambient light sensors, temperature sensors, air pressure sensors, gas sensors, particulate sensors, magnetic sensors, motion and orientation sensors (e.g., inertial measurement units based on one or more sensors such as accelerometer, gyroscopes, and magnetometers), strain gauges, etc.

Electronic device 10 may interact with equipment such as charging system 42 (sometimes referred to as a charging mat, charging puck, power adapter, etc.). Electronic device 10 may also interact with other external equipment 44 (e.g., an accessory battery case, earphones, network equipment, etc.). Charging system 42 may include wired power circuitry and/or wireless power circuitry. For example, charging system 42 may include a wired power source that provides direct-current power to device 10 from a mains power supply (e.g., system 42 may include an alternating-current-to-direct current adapter, etc.). Direct-current power may also be supplied to device 10 from a battery case or other external equipment 44 plugged into a port associated with a connector such as one of connectors 40 in device 10 or other equipment for supplying power such as direct-current power over a cable or other wired link coupled to connector 40. If desired, charging system 42 may include wireless power transmitting circuitry for supplying wireless power to electronic device 10. Wireless power transmitting circuitry in system 42 may, for example, include an oscillator and inverter circuitry that drives a signal into a coil and thereby causes the coil to produce electromagnetic fields that are received by a corresponding coil in device 10 (see, e.g., coil 32 and associated wireless power receiver 34 in wireless power receiver circuitry 30). Configurations in which wireless power is transmitted using capacitive coupling arrangements, near-field wireless power transmissions, and/or other wireless power arrangements may also be used. The use of an inductive wireless power arrangement in which system 42 and device 10 support inductive power transfer is merely illustrative.

Using communications circuitry 18, device 10 can communicate with external equipment such as equipment 44. Equipment 44 may include accessories that can be communicatively coupled to device 10 (e.g., ear buds, covers, keyboards, mice, displays, etc.), may include wireless local area network equipment and/or other computing equipment that interacts with device 10, may include peer devices (e.g., other devices such as device 10), may include covers, cases, and other accessories with optional supplemental batteries, and/or may include other electronic equipment.

Device 10 may include power circuitry such as power system 28 (sometimes referred to as control circuitry). Power system 28 may include a battery such as battery 38. Battery 38 of device 10 may be used to power device 10 when device 10 is not receiving wired or wireless power from another source. In some configurations, device 10 may use battery power associated with an accessory (e.g., external equipment 44). System 42 may also power device 10 using wired or wireless power.

Power system 28 may be used in receiving wired power from an external source (e.g., system 42 or a battery case) and/or may include wireless power receiving circuitry 30 for receiving wirelessly transmitted power from a corresponding wireless power transmitting circuit in system 42. Wireless power receiving circuitry 30 may, as an example, include a coil such as coil 32 and an associated wireless power receiver 34 (e.g., a rectifier). During operation, coil 32 may receive wirelessly transmitted power signals and wireless power receiver 34 may convert these received signals into direct-current power for device 10. Power management circuit 36 may be used in managing the power from wireless power receiver 34. Power management circuitry 36 may be formed from one or more power management unit integrated circuits and may form part of control circuitry 12 of FIG. 1. During operation, power management circuitry 36 may distribute received power to internal circuitry in device 10 and/or to battery 38 (e.g., to charge battery 38).

The operation of power system 28 may be controlled based on the status of battery 38 (e.g., the current level of charge in battery 38), based on nature and quantity of power available from external sources (e.g., a battery in an accessory case, wired or wireless power from a power source such as system 42, etc.), and based on other factors. For example, if battery 38 is depleted, charging of battery 38 may be prioritized over powering internal components in device 10. Battery charging can also be prioritized based on current and/or historical factors related to the user's usage of device 10, measured temperature information, whether device 10 is in motion or is stationary, based on position information (e.g., satellite navigation system data indicating where device 10 is currently located), information on the speed of device 10 relative to the Earth (e.g., whether or not device 10 is moving in a vehicle), information in a software program such as a calendar or other program, user settings, and/or other information.

In some situations, the amount of power received by device 10 from external source(s) such as system 42 will be limited to a maximum amount (e.g., an amount dictated by the capabilities of a wireless charging mat or other equipment that is being used to supply device 10 with power). A wireless charger may, for example, be capable of supplying device 10 with a maximum of 5 W of wireless power. The internal power circuitry in device 10 may also have a maximum capacity (e.g., a limit to avoid excess currents, etc.). As a result, the amount of power that can be received by power system 28 and distributed to: 1) internal circuitry in device 10 such as control circuitry 12, communications circuitry 18, and other non-battery-charging circuitry and 2) battery 38 is constrained. In these circumstances, device 10 benefits from intelligently allocating power between internal circuitry and battery 38. This helps ensure that battery 38 is charged at appropriate times at a suitably rapid pace.

If, as an example, the amount of power being received from system 42 at a given point in time is large, both the internal circuitry of device 10 and battery 38 can receive essentially unlimited amounts of power so long as the inherent limitations on the circuitry of device 10 are observed (e.g., thermal limits, current limits for safety, etc.). This allows battery 38 to be charged as rapidly as desired and simultaneously allows control circuitry 12 and/or other hardware in device 10 to draw as much power as desired to accomplish desired software and/or hardware processing objectives such as gaming and/or video playback.

In many circumstances, however, available power is more limited. As an example, wireless power transmission may be somewhat limited due to the wireless power delivery capabilities of system 42, due to suboptimal coupling between system 42 and device 10, and/or due to the presence of competing devices (e.g., other devices that are being simultaneously charged by system 42 and that are therefore competing for the wireless power being delivered by system 42). Particularly in power-limited circumstances, device 10 (e.g., control circuitry 12) analyzes current and historical operating conditions and other information to determine a satisfactory allocation between using power to power control circuitry 12 and other non-battery components in device 10 and using power to charge battery 38. Once a desired allocation has been determined, control circuitry 12 can adjust the operation of device 10 so that non-battery components receive a first amount of power and so that battery 38 receives a second amount of power in an appropriate ratio (e.g., in an appropriate ratio between the first and second amounts). With one illustrative configuration, control circuitry 12 can make adjustments to the software that is running on device 10 and the hardware of device that either increase or decrease the amount of power consumed by the non-battery-charging circuitry of device 10. Power management circuit 36 (e.g., a battery charging circuit in circuit 36) may then automatically use all remaining power in charging battery 38. If it is desired to charge battery 38 rapidly, for example, non-critical software and/or hardware functions can be temporarily deactivated. This will result in an increase in the amount of power available for charging battery 38.

Figure 2:
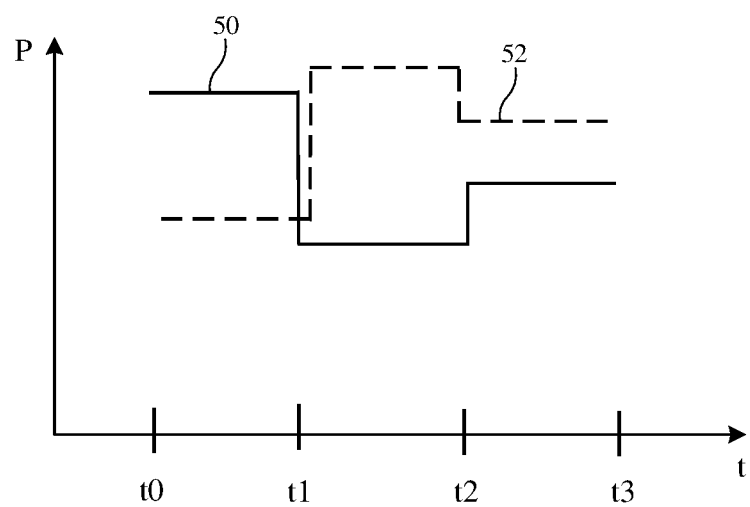
FIG. 2 is a graph illustrating how device activities other than battery charging activities can be adjusted during use of a device to accommodate battery charging in accordance with an embodiment.

Consider, as an example, the graph of system operation that is shown in FIG. 2. In the graph of FIG. 2, illustrative curve 50 represents that amount of power as a function of time t that is being used to power control circuitry 12 and other internal circuitry in device 10 other than the circuitry that charges battery 38. Illustrative curve 52 represents the amount of remaining power available in device 10 to charge battery 38. Initially, at times t between time t0 and time t1, software and hardware activities in device 10 take precedence over battery charging. As a result, curve 50 is larger than curve 52 between t0 and t1. This indicates that battery charging is being allowed to proceed at only a relatively modest rate. This mode of operation may be appropriate, for example, in a scenario in which device 10 is being used at home in the evening, where there is ample time to charge device 10 before device 10 is removed from the home. The relatively large amount of processing power that is being used between times t0 and t1 may be used, for example, for housekeeping activities such as image processing activities for organizing photographs, for other indexing activities, and for on-line database synchronization services and other cloud services.

At time t1, the user of device 10 may remove device 10 from the home (e.g., to take device 10 to the airport). While in the user's automobile, device 10 may be charged using a wired or wireless charging system in the user's automobile. At time t1, device 10 can detect that the device is moving and optionally detect that it is located in an automobile and can conclude that the user may soon be mobile outside of the automobile and unable to receive further charging. As a result, from time t1 to time t2, control circuitry 12 reduces the amount of power (curve 50) being drawn by non-battery circuitry in device 10, thereby enhancing the charging rate of battery 38 (curve 52) by directing available incoming power towards battery charging. At time t2, before reaching the user's destination, the charge state of battery 38 rises to a nearly full state. At this point, control circuitry 12 can allow the non-battery circuitry of device 10 to draw more power (e.g., curve 50 may rise between time t2 and time t3). Due to the increase in non-battery circuit power consumption, the charging of battery 38 will be somewhat reduced (curve 52 drops at time t2), but still results in an enhanced user experience as the battery has accumulated charge to support mobile use should the user do so.

In other scenarios, the detection of the presence of device 10 in an automobile may be different and/or device 10 may control the ratio between non-battery and battery charging power consumption amounts by controlling the battery charger circuit in system 28. For example, if battery 38 is nearly charged when a user takes device 10 into the automobile, control circuitry 12 may reduce the amount of power flowing to battery 38 to charge battery 38 to allow headroom for the processing circuitry in device 10 (e.g., to allow power for circuitry 12 to handle a sudden increase in processing power when performing complex navigation tasks).

Figure 3:
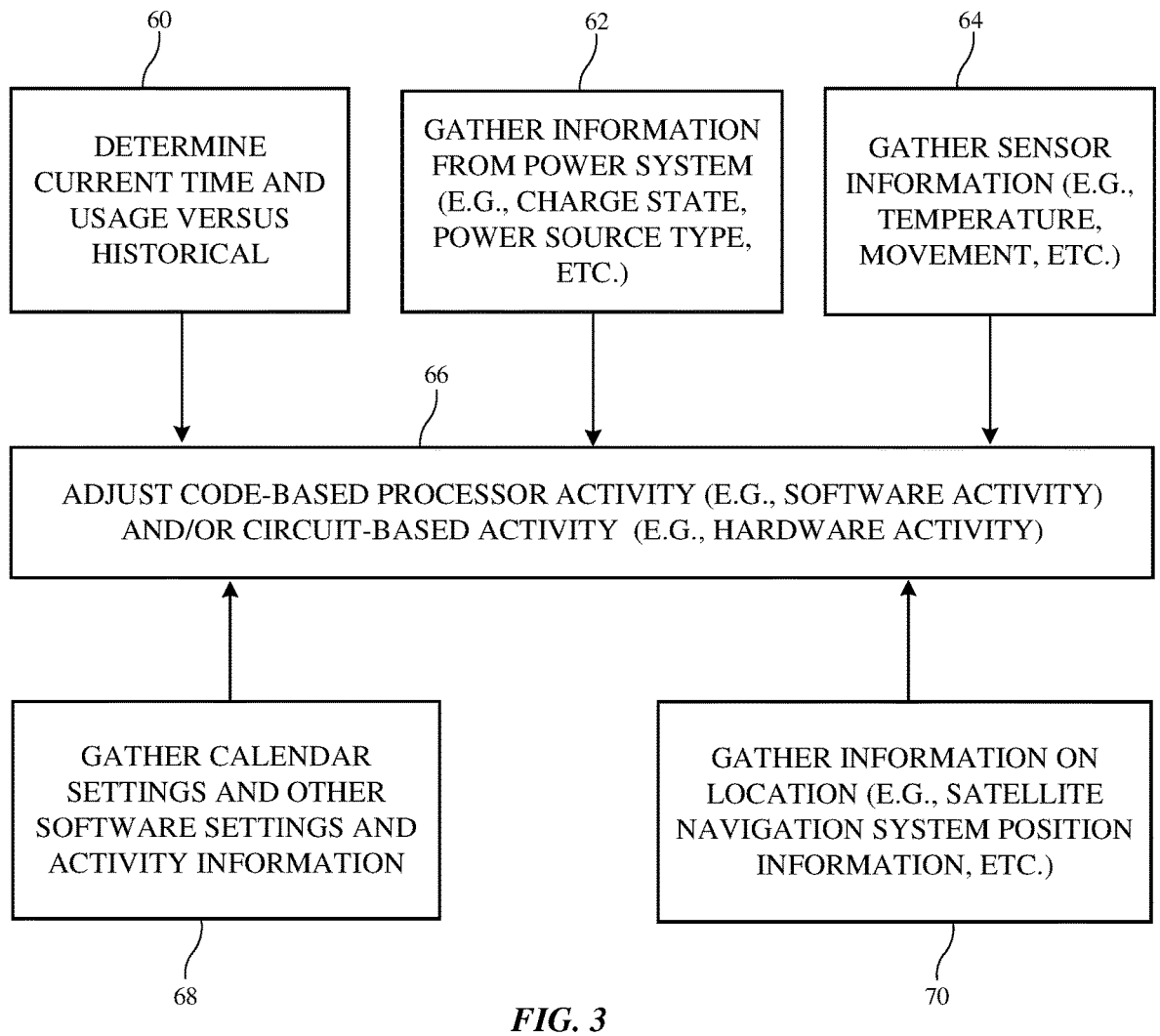
FIG. 3 is a flow chart of illustrative operations involved in using equipment of the type shown in FIG. 1 in accordance with an embodiment.

FIG. 3 is a flow chart of illustrative operations of system 8. In particular, the flow chart of FIG. 3 shows illustrative information that may be gathered by device 10 during operation in order to determine how to adjust power allocation between battery and non-battery resources. During the operations of FIG. 3, device 10 may gather information from sensors and other sources and may use this information in controlling the supply of power for battery charging of battery 38 and the supply of power to run control circuitry 12 (and other non-battery circuitry in device 10).

During the operations of blocks 60, 62, 64, 68, and 70, device 10 (e.g., control circuitry 12) may gather information on which to base a decision on power allocation. In some embodiments, during the operations of block 66, device 10 (e.g., control circuitry 12) makes corresponding adjustments to the operation of device 10, so that battery 38 and the remaining components in device 10 can receive appropriate respective portions of the available power. As an example, if additional power is desired for charging battery 38, device 10, during the operations of block 66, reduces software activity (e.g., by terminating, temporarily stopping, or partially curtailing the execution of code on processor 12 using a scheduling management subsystem or other resources on device 10) and/or reduces hardware activity (e.g., by halting code execution by one or more cores 14 in processor 12, by reducing the processor clock for control circuitry 12, and/or by selectively depowering power consuming components in device 10). When curtailing software activity, the activity that is curtailed can span one or more processes and/or may involve one or more tasks associated with those processes. In an environment in which multiple software activities are being performed, one or more of these activities can be stopped to curtail activity. Hardware throttling may involve reducing the number of cores 14 that are in use and/or other adjustments to the circuitry of device 10 that affect how much power is being consumed by device 10 (e.g., clock settings, processor options, hardware accelerator options, wireless communications settings and/or other communications circuit settings, display brightness settings, display refresh rate settings, display resolution settings, etc.).

In some embodiments, the operations of block 66 involve reducing software activity in device 10. For example, the amount of code-based processor activity (e.g., processor activity involved in executing computer code) is reduced by terminating software tasks/processes. The software that is terminated is, for example, associated with operating system functions. In one illustrative example, an operating system function is used to cluster photographs by performing scene and/or facial recognition on a library of images. This function may be processing intensive and may slow down device 10 by 25% or more when active. When it is desired to free up more power in device 10 for charging battery 38, the image clustering function or other image processing activities performed by device 10 is stopped (or reduced in speed/intensity) before these activities reach their natural termination. As additional examples, email downloading activities and/or email attachment downloading activities can be suspended, maintenance tasks associated with operating system functions may be terminated (e.g., tasks associated with compressing files, indexing files, uploading information to cloud servers, downloading and/or installing updates, executing training algorithms (e.g., training algorithms involving processing of location data to determine if a user is at home or at work), and/or other power-intensive code-based processor activities can be selectively suspended/terminated.

Hardware adjustments that can be made during the operations of block 66 involve reducing processor clock speeds, limiting the maximum clock speed associated with clock speed bursts, reducing the number of processor cores that are active, turning off or otherwise adjusting components that consume larger amounts of power (e.g., turning off a satellite navigation system receiver or reducing satellite navigation system receiver power consumption when not needed, turning off image-based sensors, lowering maximum permitted screen brightness in a display, lowering display refresh rates, lowering display resolution, etc.).

Changes to software activity and/or hardware activity may be made based on any suitable information gathered by device 10 and/or received by device 10 from remote equipment. For example, non-battery charging power consuming activities (code-based and/or hardware-based) may be adjusted based on information gathered during operations of device 10 such as the operations of blocks 60, 62, 64, 68, and 70.

During the illustrative operations of block 60, device 10 may determine the current time of day (e.g., using clock 16) and may update historical information on the usage of device 10. For example, information on when device 10 is being used by a user and which components are being used and other status information may be maintained in a database in device 10 and/or on a remote server. Whenever device 10 is used, additional usage information may be stored in the database. In this way, device 10 may be provided with a user profile of popular and unpopular usage times.

The usage history information maintained by device 10 may allow device 10 to determine how to allocate power between non-battery-charging operations and battery charging operations. For example, usage history information may indicate when a fully charged battery is desirable. If, as an illustrative example, a user's usage history indicates that a user's device is mobile for four hours every Thursday starting at 11 AM and is never charged during this time period (because charging is not available or is not convenient), device 10 can make adjustments during the operations of block 66 in advance of that time to ensure that battery 38 is fully charged by Thursday at 11 AM. As another example, battery charge state preservation may be prioritized during the middle of the day, when a user is generally away from charging locations and is most likely in need of extended battery power. Late at night, when a user is likely sleeping, battery charging is expected to complete over a period of many hours (e.g., overnight), so device 10 need not prioritize battery charging (e.g., background software tasks and other discretionary activities in device 10 can be allowed to take place as expected in an environment without power constraints).

Information from power system 28 may be gathered during the operations of block 62. During the operations of block 62, device 10 may, for example, gather information on whether charging system 42 is being used to supply power to device 10, whether power is being provided wirelessly or through a wired connection, etc. For example, device 10 can determine whether power is being supplied from a wireless charging device. Information may be gathered on the charge state of battery 38, the amount of power being received by power system 28 from external equipment such as system 42, the amount of power being requested by power management circuit 36 to charge battery 38 (which may be comparable to the amount of delivered power or which may be significantly less than the amount of power that system 42 is able to deliver), the maximum rating of system 42, and/or other information on the power delivery environment and capabilities of system 8.

When it is determined that device 10 is in a location with ample charging power, device 10 may increase non-battery-charging activities during the operations of block 66. If, however, it is determined that device 10 is running off of battery power in an accessory case (whether from information device 10 receives during charging on the identity of the charging device or from additional information such as motion sensor information indicating that device 10 is not currently likely to be receiving power from a power adapter plugged into a mains power supply), non-battery-charging activities can be throttled (reduced) to preserve battery power in device 10 and in the external case.

In some situations, device 10 may sense that a user is charging device 10 at an unusual time of day (e.g. at a time of day that is not typically associated with the user's normal charging routine). If abnormal charging patterns are detected, it can be assumed that the user has an urgent charging need and battery charging activities can be given precedence over non-battery-charging activities. Device 10 may also conclude that charging needs are urgent and can prioritize charging accordingly in response to detecting that the charge level of battery 38 has dipped below the user's normal lowest levels. In yet another illustrative arrangement, charging can be prioritized immediately upon detecting that device 10 has been coupled to a system 42 and is receiving power. For example, device 10 may be disconnected from system 42 (e.g., because a user is traveling away from the user's home or office). When the user arrives at the user's home or office, device 10 may be coupled to system 42 (with a cable or wirelessly) and may start receiving power from system 42. In response to detecting that device 10 (power system 28) has transitioned from a first mode of operation in which power was not being received by device 10 and system 28 to a second mode of operation in which power is being received by device 10 and system 28, device 10 can (at least temporarily) reduce the amount of power that is being consumed by non-battery-charging operations, thereby favoring battery charging and ensuring that battery 38 will be charged expeditiously.

During the operations of block 64, device 10 may gather sensor information from sensors 26 in device 10. As an example, device 10 can gather information from a temperature sensor and/or an ambient light sensor. Temperature and/or ambient light information may be used to determine whether device 10 is in an environment with elevated temperatures (e.g., a bright and hot outdoors environment, etc.). Information on the operating environment of device 10 may also be gathered from on-line weather sources, from location information, etc. In operating environments with an elevated temperature and/or an elevated light exposure, there is an elevated sensitivity to operating device 10 with high amounts of software and/or hardware activity. As a result, when it is determined that device 10 is operating in a thermally challenging environment, device 10 can proactively reduce software and/or hardware activity at block 66 to maintain device 10 below its thermal limits and thereby maintain sufficient thermal headroom for dynamically demanded activities and battery charging.

As another example, device 10 (e.g., control circuitry 12) may gather motion sensor information from an inertial measurement unit (accelerometer, compass, and/or magnetometer) during the operations of block 64. If desired, motion information can also be gathered from a satellite navigation system receiver in circuitry 20 during the operations of block 70 (e.g., by gathering velocity information from the satellite navigation system receiver and/or by comparing satellite navigation system receiver location measurements over a known period of time). By analyzing the speed of the user and other attributes of a user's motion (e.g., average and peak accelerometer values, accelerometer output trends, etc.), device 10 can determine whether device 10 is stationary, whether device 10 is in motion in a vehicle such as an automobile, whether device 10 is in motion in a user's pocket or hand, whether a user of device 10 is walking or jogging, and/or other attributes of the usage of device 10 related to device motion and/or orientation.

During the operations of block 66, device 10 can take appropriate action in response to measured motion sensor information. If device 10 is being carried in the pocket of a user and is far away from a wireless charging mat or other wireless power source, the power source will not be able to deliver power to device 10. Accordingly, if device 10 determines from motion sensor data that device 10 is in motion in the pocket of a user, device 10 may conclude that wireless power for device 10 is not available. Device 10 may therefore take appropriate action at block 66 such as reducing software and/or hardware activity to preserve battery charge while device 10 is away from external power source 42. If, as another example, a user is determined to be in motion in an automobile, device 10 can make power allocation adjustments suitable for use of device 10 in an automobile environment. As one example, usage history information or other information may indicate that the user's automobile is an environment in which the power delivery capacity of system 42 is weaker than in other environments. In this type of situation, device 10 may reduce background software activity and/or other non-essential activity to help prioritize battery charging while maintain desired processing headroom for navigation activities performed by device 10. As another example, if usage history information or other information indicates that the user's automobile has readily available power, device 10 may allow more background software activities to be performed.

In some situations, device 10 may not be able to determine from power system 28 whether device 10 is obtaining power from a power adapter plugged into a wall outlet or whether device 10 is receiving supplemental battery power from an accessory battery case. By using motion information, device 10 can determine whether device 10 is stationary or is in motion. In situations in which device 10 is in motion, device 10 can conclude that the user is away from a wall outlet and is therefore in need of preserving battery charge. Device 10 can therefore reduce software and hardware activity during the operations of block 66 to help preserve the charge on battery 38 and the battery in the accessory case.

Information on device motion may, if desired, be stored with other usage data in a usage database (e.g., with time/date stamps obtained from the current time readings of block 60). This allows device 10 to build a histogram of a user's stationary and mobile uses of device 10 and allows device 10 to proactively adjust activities during block 66 (e.g., to prioritize battery charging over other operations at times just in advance of the user's most prevalent mobile device usage times, etc.).

If desired, activity (one or more code-based processor activities and/or one or more hardware activities, etc.) can be stopped or otherwise adjusted based on the type of power being delivered to device 10. If, for example, wireless power reception is detected at block 62, one or more activities performed during wired power reception may be stopped (e.g., before their natural termination due to task completion, etc.).

The operations of block 70 may be used in gathering user position information (e.g., geographic location information such as information on whether a user is at home, is at work, is at frequently-visited public location such as a gym, a coffee shop, etc.). Information on a user's location and daily activities can also be gathered from calendar entries and/or other software settings during the operations of block 68. This information can be used to help prioritize battery charging before time periods in which charging is not convenient or possible.

If, as an example, device 10 determines from a calendar entry in a user's calendar that a user is taking a plane flight from 1-4 PM on Wednesday or is otherwise planning to participate in an activity in which wireless and/or wired charging from system 42 is not possible or inconvenient, device 10 can reduce activity for non-battery-charging functions in advance. For example, device 10 can reduce software and hardware activity on Wednesday morning to reduce non-battery-charging power consumption and thereby prioritize battery charging. In this way, device 10 can ensure that battery 38 is fully charged before the user's flight.

A user's charging history and other usage history can include location data (e.g., usage location) so that device 10 can predict when charging is likely to occur and when charging is likely to be inconvenient based on location. When a user is at a convenient charging location or is expected to be arriving at a convenient charging location before battery 38 has been depleted excessively, battery charge may be allowed to drop in favor of appropriate software and/or hardware activity. When a user is at an inconvenient charging location or is expected to be travelling to a location that is inconvenient for charging, battery charging can be prioritized to ensure that the user will have adequate battery reserves while at the inconvenient charging location. When a user is away from any previously known locations, it may be assumed that the user is traveling and suitable actions taken to help extend battery power by reducing non-battery-charging activities during the operations of block 66.

The foregoing is merely illustrative and various modifications can be made to the described embodiments. The foregoing embodiments may be implemented individually or in any combination.

What is claimed is:

1. An electronic device comprising:
a satellite navigation system receiver configured to gather geographic location information;
a battery; and
control circuitry coupled to the battery and the satellite navigation system receiver, wherein the control circuitry is configured to reduce power consumption by the control circuitry responsive to the electronic device being in motion as identified by the geographic location information gathered by the satellite navigation system receiver.

2. The electronic device of claim 1, wherein the control circuitry is configured to reduce the power consumption in response to the electronic device receiving power via a wired connection while the geographic location information identifies that the electronic device is in motion.

3. The electronic device of claim 1, wherein the control circuitry is configured to gather velocity information using the satellite navigation system receiver and is configured to adjust the power consumption based on the velocity information.

4. The electronic device of claim 1, wherein the control circuitry is configured to consume power through code-based processor activity and wherein the control circuitry is configured to reduce the power consumption by reducing the code-based processor activity to increase power available for charging the battery.

5. The electronic device of claim 1, wherein the control circuitry comprises processor cores and wherein the control circuitry is configured to reduce the power consumption by suspending use of one of the processor cores to increase power available for charging the battery.

6. The electronic device of claim 1, wherein the control circuitry is configured to determine time of day and wherein the control circuitry is further configured to adjust the power consumption based on the time of day.

7. The electronic device of claim 6, wherein the control circuitry is configured to maintain charging history information on charging of the battery, and wherein the control circuitry is configured to adjust the power consumption based on the charging history information and the time of day.

8. A non-transitory computer-readable storage medium storing one or more programs configured to be executed by one or more processors of an electronic device having control circuitry, a motion sensor, and a battery, the one or more programs including instructions for:
gathering motion sensor data using the motion sensor, wherein the gathered motion sensor data is indicative of the electronic device being in motion; and
responsive to the electronic device being in motion as indicated by the motion sensor data gathered using the motion sensor, reducing power consumption by the control circuitry.

9. The non-transitory computer-readable storage medium of claim 8, further comprising instructions for:
responsive to the motion sensor data gathered using the motion sensor, reducing code-based processor activity at the control circuitry.

10. The non-transitory computer-readable storage medium of claim 8, further comprising instructions for:
responsive to the motion sensor data gathered using the motion sensor, suspending use of a processor core in the electronic device.

11. The non-transitory computer-readable storage medium of claim 8, further comprising instructions for:
gathering geographic location information using a satellite navigation system receiver; and
adjusting the power consumption based on the geographic location information gathered using the satellite navigation system receiver.

12. The non-transitory computer-readable storage medium of claim 11, further comprising instructions for:
gathering velocity information using the satellite navigation system receiver; and
adjusting the power consumption based on the velocity information.

13. The electronic device of claim 1 further comprising:
a motion sensor configured to detect motion, wherein the control circuitry is configured to adjust the power consumption by the control circuitry based on the motion detected by the motion sensor.

14. The electronic device of claim 1, wherein the motion identified by the geographic location information gathered by the satellite navigation system receiver is indicative of the electronic device being in a vehicle and wherein the control circuitry is configured to reduce the power consumption by the control circuitry responsive to the electronic device being in the vehicle.

15. The electronic device of claim 1, wherein the motion identified by the geographic location information gathered by the satellite navigation system receiver is indicative of the electronic device being away from a power source and wherein the control circuitry is configured to reduce the power consumption by the control circuitry responsive to the electronic device being away from the power source.

* * * * *